United States Patent [19]

Yamada

[11] Patent Number: 4,648,833

[45] Date of Patent: Mar. 10, 1987

[54] HOT NOZZLE FOR RUNNERLESS MOLD

[76] Inventor: Fujio Yamada, 50, Toei 3-chome, Chiryu-shi, Aichi-ken, Japan

[21] Appl. No.: 788,742

[22] Filed: Oct. 17, 1985

[51] Int. Cl.⁴ .......................... B29C 45/03; B29F 1/03
[52] U.S. Cl. .................................... 425/549; 425/566; 425/570; 425/571; 425/DIG. 224; 425/DIG. 227
[58] Field of Search ............... 425/547, 549, 556, 564, 425/566, 568, 570–572, 588, DIG. 224, DIG. 227, DIG. 243, DIG. 245, DIG. 246

[56] References Cited

U.S. PATENT DOCUMENTS

| | | | |
|---|---|---|---|
| 3,520,026 | 7/1970 | Stidham et al. | 425/572 X |
| 3,800,027 | 3/1974 | Tsutsumi | 425/547 |
| 3,952,927 | 4/1976 | Schaumburg et al. | 425/564 X |
| 4,171,941 | 10/1979 | Yotsutsuji et al. | 425/566 X |
| 4,304,544 | 12/1981 | Crandell | 425/568 X |
| 4,516,927 | 5/1985 | Yoshida | 425/564 X |
| 4,576,567 | 3/1986 | Gellert | 425/568 X |
| 4,588,367 | 5/1986 | Schad | 425/571 X |

*Primary Examiner*—Robert Spitzer
*Attorney, Agent, or Firm*—Dennison, Meserole, Pollack & Scheiner

[57] ABSTRACT

Disclosed herein is a hot nozzle for use with a mold for runnerless injection molding of plastic material. The hot nozzle includes a body formed of a conductive metal having a predetermined electrical resistance. The body has a nozzle portion and a base portion, and has a pair of diametrically disposed longitudinal slits extending substantially over the length thereof except at least a portion of the forward end of the nozzle portion in such a manner as to divide the nozzle portion substantially into two sections. The base portion has on opposite ends separated by the slits a pair of power receiving mechanisms for connection to an external source of power. With this arrangement, the nozzle portion itself, particularly at the front end thereof, is heated by voltage applied across the opposite ends of the base portion. Further, the outer surface of the nozzle body is covered with a dielectric and adiabatic film so as to prevent leakage of resin from the nozzle through the slits and ensure both electrical and thermal insulation of the heating nozzle portion.

6 Claims, 8 Drawing Figures

HOT NOZZLE FOR RUNNERLESS MOLD

BACKGROUND OF THE INVENTION

1. Field of the Invention

The present invention relates to a hot nozzle for use with a mold for runnerless injection molding of plastic material, and more particularly to such hot nozzle structure in a hot runner system using a hot runner type runnerless mold.

2. Description of the Prior Art

Conventionally, many of plastic products used in daily necessaries, domestic electric apparatus, automobiles and other industry are manufactured by injection molding. In such injection molding, hot molten resin is injected under high pressure through runners into cavities of a mold, and after cooled, the molded product is removed from the mold. Inevitably, the molded product includes resin hardened in the runners, and therefore requires an additional operation to sever and remove the hardened resin. Such an operation is time- and labor-consuming work, and tends to reduce yields of product. Reclamation of the resin further requires cumbersome operations such as crushing. Particularly, all of these disadvantages are evident in multi-cavity molds.

Thus, it has been desired to provide a mold with no runner, or one having runners but eliminating the need for removing such runners at every molding operation. The hot runner system has been devised in order to meet this particular desire.

One known hot runner system is shown in FIG. 8 and as may be seen, a fixed mold half 101 and a movable mold half 102 define therebetween a plurality of cavities 103 (only one is shown in FIG. 8). The fixed mold half 101 has formed therein a longitudinal bore 104 in place of a runner which communicates with the cavity 103. A torpedo spreader 105 is mounted on the fixed mold half 101 at the inlet of the bore 104, with its elongated portion 105a protruding into the bore 104. The torpedo spreader 105 has formed therein passages 107 (only one is shown in FIG. 8) communicating with a molten resin dispensing manifold 106 through which molten resin is supplied from a nozzle of the injection molding machine (not shown). The molten resin passes through the passages 107 into a space 108 defined in the bore 104 between the fixed mold half 101 and the elongated portion 105a of the torpedo spreader 105, and flows into the cavity 103. The torpedo spreader 105 has formed therewithin an insertion hole 109 extending substantially up to the top end of the elongated portion 105a for accommodating a heater 110 which can be energized by an external source of power through a lead wire 111.

In such a hot runner system employing a so-called internal heating system, the resin in the bore 104 corresponding to a runner is heated by the heater 111 through the elongated portion 105a of the spreader 105 to be always maintained in a molten state and hence, the molded article has no runner when removed from the cavity 103.

It should be noted, however, that in this hot runner system having an internal heating mechanism, the molten resin in the spacing 108 contiguous to the fixed mold half 101 tends to be hardened and stagnant as it is cooled by the fixed mold half 101. If the temperature of the heater is raised to prevent such stagnation, the resin in the vicinity of the elongated portion 105a of the spreader 105 will be thermally decomposed and clung to that portion. Thus, temperature control is difficult and power consumption is increased. Additionally, as resin is always stagnant in the bore 104, change of colors of resin will cause mixture of a color with the previous one, resulting in production of defective articles. Further, such a hot runner system has other disadvantages that the spreader body is difficult to machine, and that the construction is itself complicated.

The prior art hot runner system has also employed a socalled external heating mechanism in which a nozzle has therewithin a passage for molten resin, and a band heater is attached to the outside of the nozzle, or a heater is incorporated in the nozzle as a unit.

In this arrangement, however, heat of the heater tends to escape through the nozzle-mounting bore to the fixed mold half, resulting in increase in power consumption of the heater. In order to heat resin over the length of the nozzle-mounting bore, the heater must be provided over the length of the nozzle, and usually another heater is provided to heat the top end of the nozzle and facilitate the flow of resin into the cavity. Consequently, complexity of the structure and difficulty in temperature control are disadvantageously increased.

SUMMARY OF THE INVENTION

An object of the present invention is to provide a hot nozzle which can substantially prevent escape of heat of resin in the nozzle to the mold and is free from stagnation of cooled resin and consequent mixture of colors during color changeover.

Another object of the present invention is to provide a hot nozzle having a heating system which is simple in construction.

A further object of the present invention is to provide a hot nozzle having a heating system in which accurate and easy temperature control may be accomplished.

A still further object of the present invention is to provide a hot nozzle having a heating system whose power consumption for heating is small.

According to the present invention, there is provided a hot nozzle for use with a runnerless mold having at least one mold cavity and a longitudinal bore communicating with the mold cavity. The hot nozzle comprises a body formed of a conductive metal having a predetermined electrical resistance. The body has a nozzle portion adapted for insertion into the bore of the mold and a base portion communicating with the nozzle portion to provide for the flow of molten resin to the mold cavity. The body also has a pair of diametrically disposed longitudinal slits extending substantially over the length thereof except at least a portion of the forward end of the nozzle portion in such a manner as to divide the nozzle portion substantially into two sections. The base portion has on opposite ends separated by said slits a pair of power receiving means for connection to an external source of power. With this arrangement, the nozzle portion itself, particularly at the front end thereof, is heated by voltage applied across the opposite ends of the base portion. Further, the outer surface of the nozzle body is covered with a dielectric and adiabatic film so as to prevent short and leakage of resin from the nozzle through the slits.

In the present invention, the nozzle body is so constructed that the nozzle portion is heated mainly at the front end thereof and hence, heating of such a nozzle portion can be accomplished in a simpler construction than heating by a heater incorporated in a nozzle or a band heater attached to the outside of the nozzle. Particularly, when the wall of the nozzle portion is formed thin, the heat capacity of the nozzle portion becomes so small as to permit rapid rise and fall of the temperature by energizing and deenergizing the nozzle. Thus, both easy and accurate temperature control may be accomplished.

In accordance with the preferred embodiment of the invention, the outer surface of the nozzle body is coated with a dielectric and adiabatic film in such a manner as to cover the slits and hence, short and leakage of resin through the slits may be prevented, and also escape of heat from the nozzle portion may be prevented, there being no need for additional heating of the nozzle portion for compensating the dissipated heat. Thus, the provision of film on the nozzle body is effective to prevent thermal decomposition of resin which may be caused by additional heating of the nozzle portion and prevent consequent stagnation of resin in the nozzle which will cause mixture of colors at color changeover. Further, prevention of heat escape from the nozzle portion is also effective to lower power consumption for energy saving.

In the preferred embodiment of the invention, the film is formed by depositing ceramic powder onto the outer surface of the nozzle body.

In an alternative embodiment of the invention, the nozzle portion is surrounded by an adiabatic protection pipe such as of ceramic which may more effectively prevent dissipation of heat from the nozzle portion.

In a further embodiment of the invention, the outer diameter of the protection pipe is smaller than the inner diameter of the bore of the fixed mold half so that a clearance is provided between the pipe and the inside wall of the bore. Thus, heat dissipation may be more effectively prevented.

The present invention will become more fully apparent from the claims and description as it proceeds in connection with the drawings.

DETAILED DESCRIPTION OF THE PREFERRED EMBODIMENT

Figure 1:
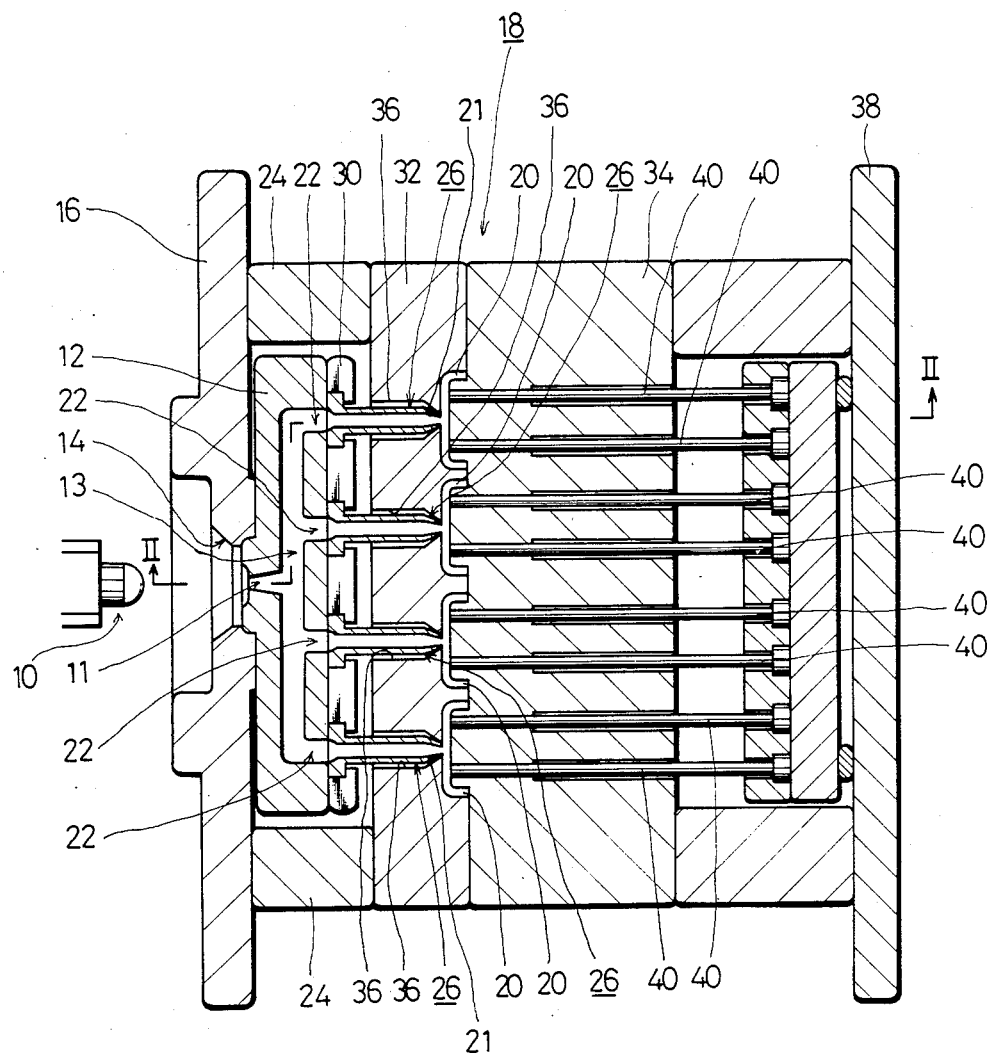
FIG. 1 is a horizontal sectional view of an injection molding mechanism using the hot nozzles of the invention.
Figure 2:
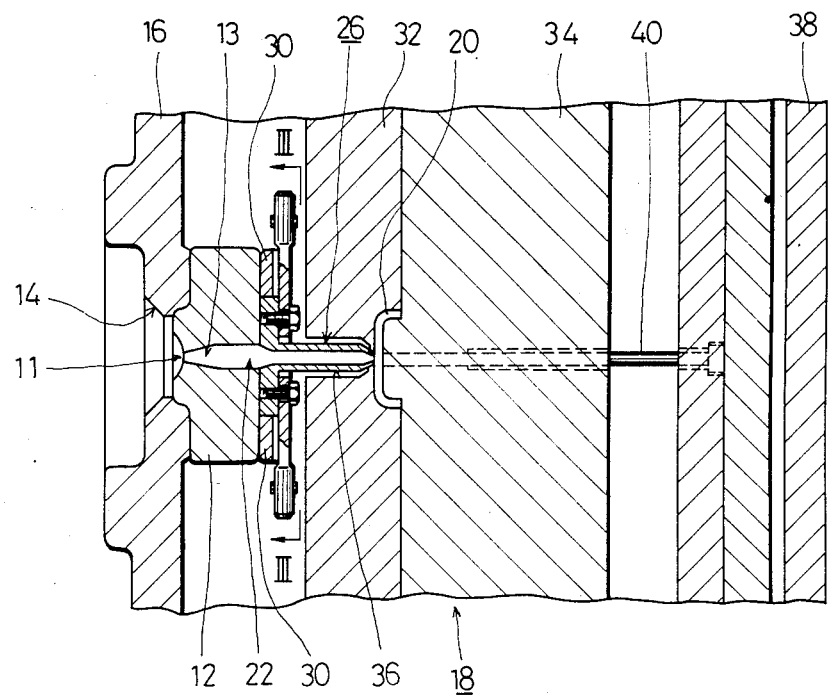
FIG. 2 is a sectional view of the essential parts taken along line II—II of FIG. 1.

Referring now to FIGS. 1 and 2 of the drawings, shown therein is an injection molding mechanism of the type which is commonly to be found employed in injection molding machines. As shown therein, the injection molding mechanism includes an injection molding machine nozzle 10 and a manifold 12 adapted for feeding molten resin injected from the nozzle 10 into an internal passage 13 through an inlet 11. The manifold 12 is held by a supporting frame 16 having a nozzle-inserting opening 14 for receiving the nozzle 10 therein. The manifold 12 is provided with a plurality of resin dispensing passages 22 formed in flow communication with mold cavities 20 in a mold 18 which will be mentioned later. A spacer 24 is interposed between the supporting frame 16 and the mold 18 to provide the mounting space for the manifold 12.

Figure 3:
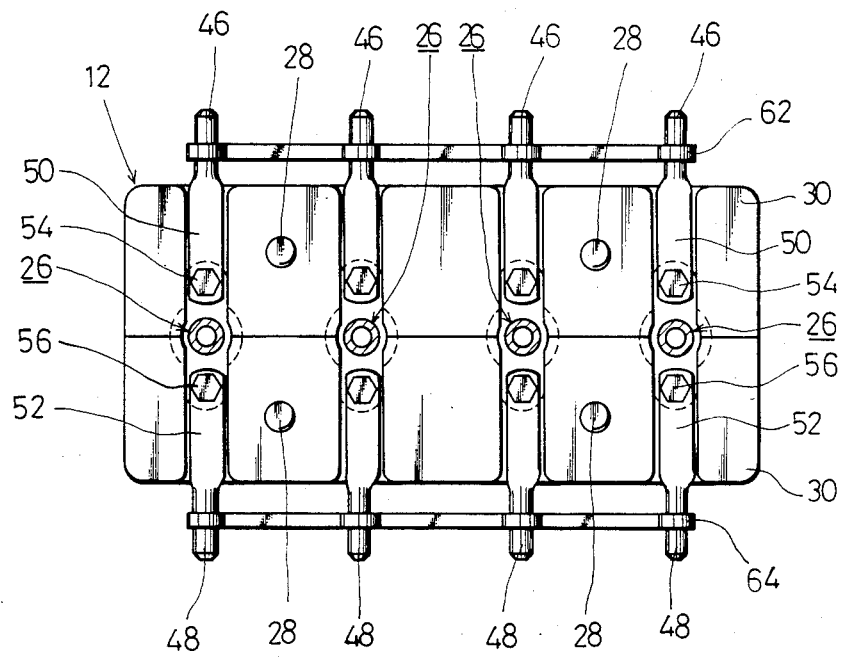
FIG. 3 is a view taken in the direction of the arrows substantially along the line III—III of FIG. 2.

The manifold 12 mounts a plurality of hot nozzles 26 (four nozzles shown in FIG. 1) of the invention in flow communication with the respective passages 22. Specifically, as shown in FIG. 3, each of the hot nozzles 26 is carried at one end on a pair of retaining plates 30 secured to the manifold 12 through bolts 28, the other end protruding into the mold 18.

The mold 18 includes a fixed mold half 32 and a movable mold half 34 which cooperate to define therebetween the mold cavities 20 when in closed position. The fixed mold half 32 has longitudinal bores 36 for receiving the respective hot nozzles 26 therein. The bores 36 communicate with the respective cavities 20 through gates 21 which are formed to tapering configuration. The movable mold half 34 may be moved in and out of contact with the fixed mold half 32 by driving means (not shown) through a supporting frame 38, and is provided with ejector pins 40 for ejecting molded articles from the cavities 20. The arrangement of such a movable mold half 34 is well known in the art and hence has not been described in detail.

Figure 4:
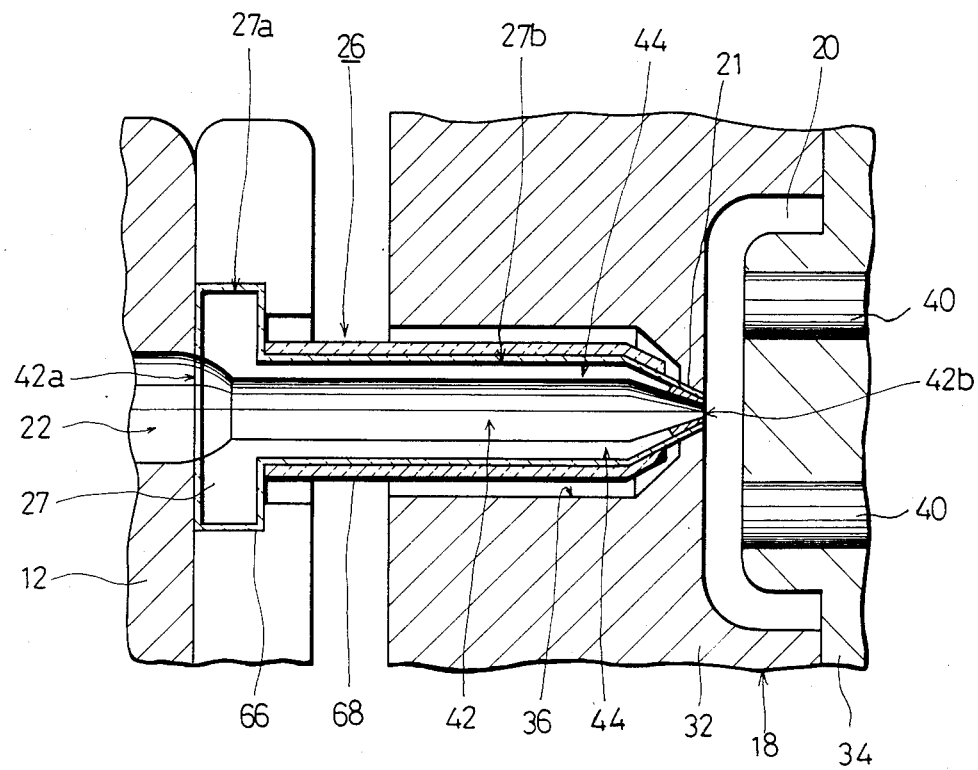
FIG. 4 is an enlarged view of a portion of FIG. 1 showing the hot nozzle in greater detail.
Figure 5:
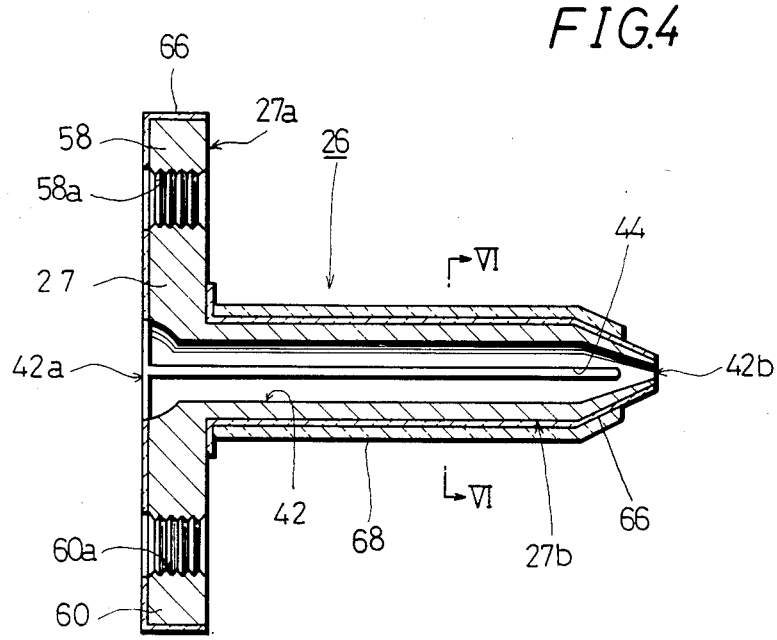
FIG. 5 is a vertical sectional view of the hot nozzle shown in FIG. 4.
Figure 6:
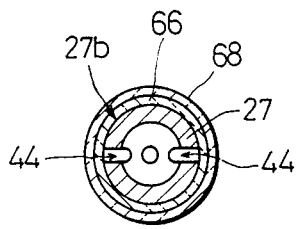
FIG. 6 is a sectional view taken along line VI—VI of FIG. 5.
Figure 7:
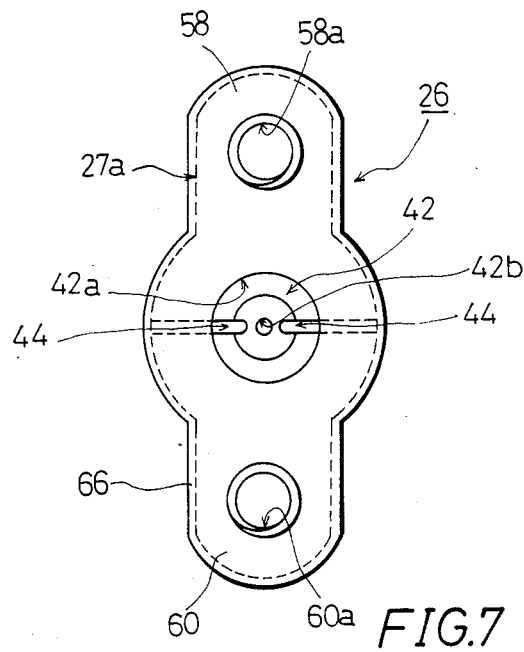
FIG. 7 is a left side view of FIG. 4.
Figure 8:
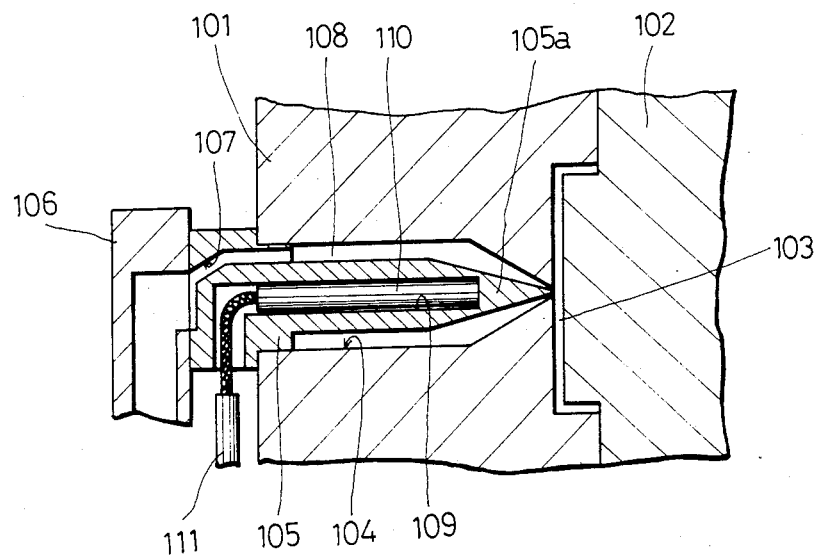
FIG. 8 is a sectional view of a conventional hot runner system.

Referring next to FIG. 4, shown therein is the pertinent construction of the hot nozzle 26. As shown therein, the hot nozzle 26 includes a body 27 formed of a conductive metal having a predetermined electrical resistance. The body 27 has a base portion 27a supported by the retaining plates 30 and a nozzle portion 27b adapted to be inserted into the longitudinal bore 36 of the fixed mold half 32 and having a conical front part tapering to the front to suit the bore 36. It should be noted that the wall of the nozzle portion 27b is formed particularly thin. The body 27 has formed therein a longitudinal passage 42 for the flow of molten resin to the mold cavity 20. As shown in FIGS. 5, 6 and 7, the body 27 has a pair of narrow longitudinal slits 44 extending therethrough except the front end of the nozzle portion 27b in diametrically opposed relationship, so that the body 27 is divided into substantially two sections thereby. The sections divided by the slits 44 have at the ends thereof in the regions normal to the slits 44 and opposing to each other a pair of power connecting portions 58, 60 having screw holes 58a and 60a for securing terminals 50, 52 of lead wires 46, 48 through screws 54, 56, respectively. As best shown in FIG. 3, the lead wire 46 is connected along with lead wires 46 of the other hot nozzles 26 to an external power supply through an interconnecting lead bar 62; and in the same way the lead wire 48 is connected along with lead wires 48 of the other hot nozzles 26 to the ground through another interconnecting lead bar 64. The voltage from the power supply is regulated by voltage regulating means operatively connected with sensors for detecting the temperature of the front part of the nozzle portion 27b and/or the temperature of resin within the nozzle portion 27b. Thus, the voltage is regulated on the basis of the temperature detected by the sensors so that the temperature of resin within the nozzle portion 27b can be always maintained at a constant level. Such temperature regulating means is well known in the art and hence has not been described in detail.

A ceramic film 66 having both dielectric and adiabatic properties is coated over the whole outer surface of the nozzle body 27 except the power connecting portions 58, 60 and the inlet portion indicated at 42a and the outlet portion indicated at 42b of the resin passage 42 in such a manner as to close the slits 44. This film 66 can be formed by hot spraying to deposit fine ceramic powder on the outer surface of the nozzle body 27 in thickness ranging from 0.3 to 0.5 mm, and its heat-resistant temperature is about 800° C.

The nozzle portion 27b of the body 27 includes a protection pipe 68 fitted thereon in substantially coextensive relationship with the longitudinal bore 36 and adapted for protecting the film 66 against shock especially when the hot nozzle 26 is inserted into the mold. The protection pipe 68 may be formed of metal but is preferably formed of ceramic for the purpose of increasing adiabatic property. It will be noted that the outer diameter of the protection pipe 68 is smaller than the inner diameter of the bore 36 so that a clearance is defined between the protection pipe 68 and the inside wall of the bore 36 to further improve adiabatic property.

Now, the operation of the hot nozzle 26 thus constructed is as follows. Molten resin injected from the machine nozzle 10 is fed through the resin dispensing passages 22 in the manifold 12 into the passages 42 formed in the respective hot nozzles 26, and then flows therethrough into the cavities 20. In this resin filling process, preferably a low voltage is applied and thence a heavy current is fed from the interconnecting lead bars 62, 64 to the hot nozzles 26 through the respective lead wires 46, 48, and each of the hot nozzles 26 itself generates heat mainly at its front part where no slit is formed so as to keep good flow of resin at the inlet region to the cavity 20 and to keep the resin within the nozzle portion 27b in the heated state. As the wall of the nozzle body 27 is thin, its heat capacity is so small as to cause rapid rise and fall of the temperature by application of power, as mentioned above, and by power cutoff, as will be mentioned later, as well as to permit accurate temperature control by the temperature control means.

When the mold cavities 20 are filled with resin, cooling water is introduced into the mold 18 to harden the resin therewithin. At the same time as the resin filling process is completed, application of power to each hot nozzle 26 is temporarily stopped, so that, when the resin in the corresponding cavity 20 is completely hardened, the resin in the front part of the nozzle portion 27b or in the inlet region to the cavity 20 is half-hardened.

When the resin in the cavities 20 is completely hardened or molding is completed, the movable mold half 34 is moved apart from the fixed mold half 32, and at the same time the pins 40 are protruded into the respective cavities 20 to eject molded articles from the mold 18. As the resin in the inlet region to the cavity 20 is half-hardened, cobwebbing of resin may be prevented during removal of molded articles, or leakage of resin from the nozzle portion 27b may be prevented after the ejecting operation.

When ejection of the molded articles is finished, the mold 18 is closed and, when the body 27 of the hot nozzle 26 is again energized and heated to a predetermined temperature, injection of resin is restarted, and the similar operations are repeated.

Although the preferred embodiment utilizes the common interconnecting lead bars 62, 64 for energizing the hot nozzles 26, it will be appreciated that separate lead wires may be used to connect the respective hot nozzles 26 to the power supply so that the temperature of the hot nozzles 26 may be individually controlled.

While the invention has been described with reference to a preferred embodiment thereof, it is to be understood that the embodiment is not intended to limit the scope of the invention and modifications or variations may be easily made without departing from the spirit of the invention.

What is claimed is:

1. A hot nozzle for use with a mold for runnerless injection molding of plastic material, said mold including a fixed mold half and a movable mold half and having at least one mold cavity formed therewithin, said fixed mold half having at least one longitudinal bore communicating with said mold cavity, said hot nozzle comprising:

a body formed of a conductive metal having a predetermined electrical resistance, said body having a nozzle portion adapted for insertion into said longitudinal bore and a base portion communicating with said nozzle portion to provide for the flow of molten resin to said mold cavity, said body having a central passage for the plastic material, a pair of diametrically disposed longitudinal slits therethrough extending substantially over the length thereof except at at least a portion of the forward end of said nozzle portion in such a manner as to divide said body substantially into two sections, said base portion having on opposite ends separated by said slits a pair of power receiving means electrically connected to an external source of power; and a dielectric and adiabatic film formed over the outer surface of said body in such a manner as to cover said slits of said body.

2. The hot nozzle as defined in claim 1 wherein said film is formed of ceramic deposited onto said body.

3. The hot nozzle as defined in claim 1 wherein the outer diameter of said nozzle portion with said film formed thereon is smaller than the diameter of said longitudinal bore of said fixed mold half so as to provide for a clearance between said film on said nozzle portion and the inside wall of said longitudinal bore when said hot nozzle is assembled with said mold.

4. The hot nozzle as defined in claim 1 further comprising a cylindrical protection pipe fitted over the outer periphery of said nozzle portion in substantially coextensive relationship with said longitudinal bore of said fixed mold half.

5. The hot nozzle as defined in claim 4 wherein the outer diameter of said protection pipe is smaller than the inner diameter of said longitudinal bore of said fixed mold half so as to provide for a clearance between said protection pipe and the inside wall of said longitudinal bore when said hot nozzle is assembled with said mold.

6. The hot nozzle as defined in claim 5 wherein said protection pipe is formed of ceramic.

* * * * *